United States Patent Office.

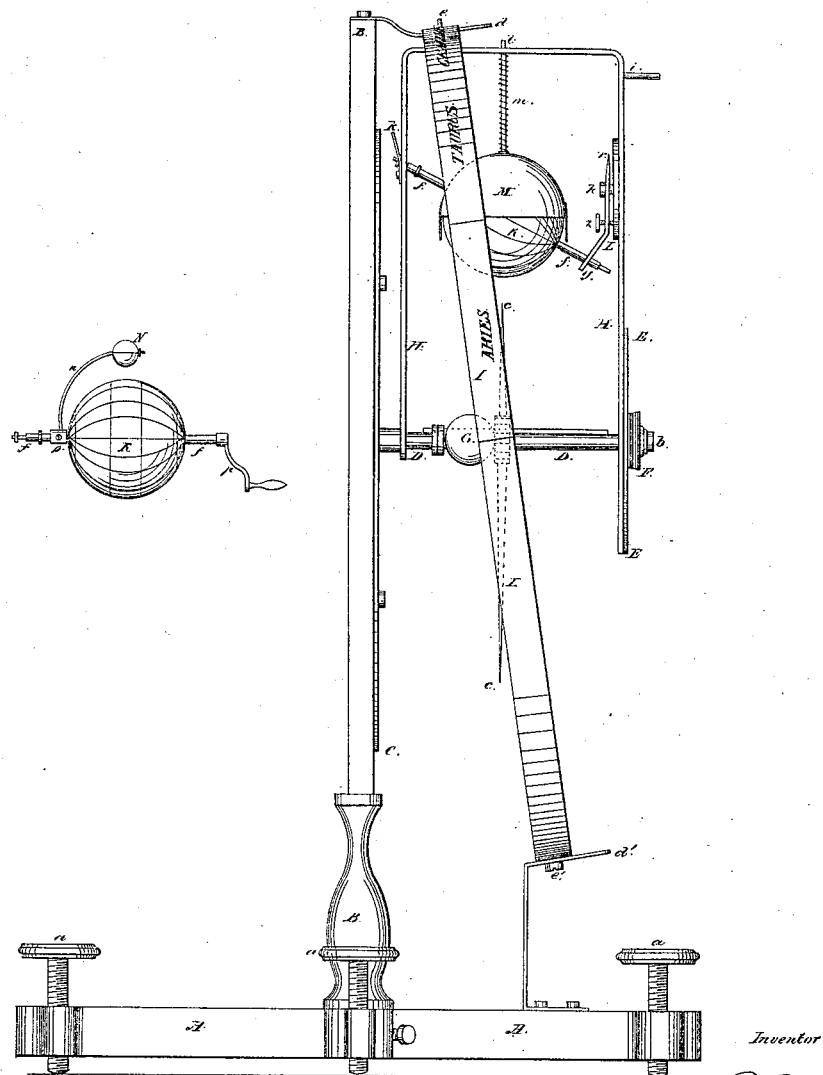
E. Root,
Terrasphere,
N°60,642.   Patented Dec. 18, 1866.

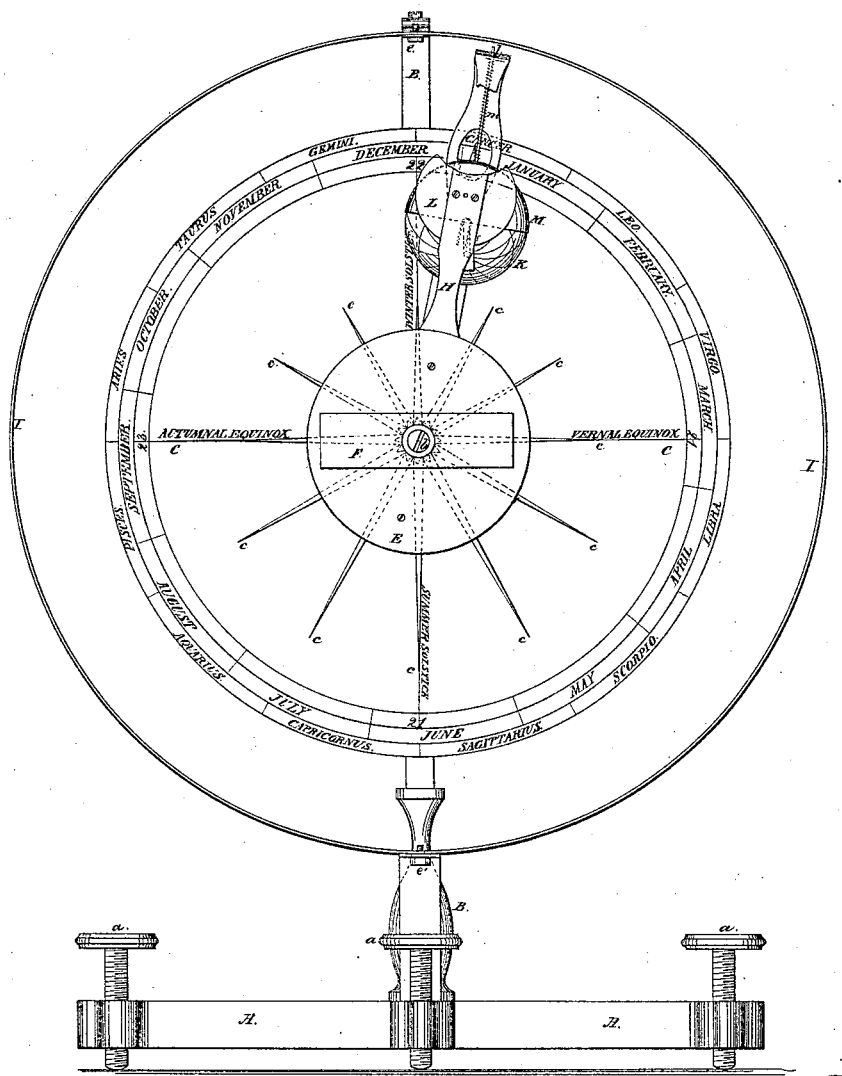

IMPROVEMENT IN TERRASPHERES.

ELEAZER ROOT, OF INDIANAPOLIS, INDIANA.

Letters Patent No. 60,642, dated December 18, 1866.

*The Schedule referred to in these Letters Patent and making part of the same.*

TO ALL WHOM IT MAY CONCERN:

Be it known that I, ELEAZER ROOT, of Indianapolis, in the county of Marion, and State of Indiana, have invented an astronomical apparatus called a Terrasphere; and I do hereby declare that the following is a full, clear, and exact description thereof, which will enable others skilled in the art to make and use the same, reference being had to the accompanying drawings, forming part of this specification, in which—

Figure 1, sheet No. 1, is a front elevation.
Figure 2, sheet No. 2, is a side elevation.
Figure 3, sheet No. 2, is a detached view of the earth and its satellite.
Similar letters of reference indicate like parts.

This apparatus is designed to exhibit correctly to the eye the true motion of the earth by means of an artificial globe revolving in a vertical circle, corresponding with the plane of the ecliptic, around a fixed centre representing the sun. It also exhibits the diurnal revolution of the earth on its own axis, with its satellite, the moon, connected and revolving around it. By these means are shown plainly the physical causes of all those sublime and beautiful phenomena of nature consequent upon the successive and constantly recurring changes in the relative position of the sun, the earth, and the moon, which are presented by the four grand divisions and subdivisions of the year into seasons; the periodical changes of day and night; the changes of the moon, and the eclipses of the sun and moon.

No attempt has been made in this instrument to exhibit proportionate magnitudes and distances, as they involve comparisons too vast for representation by mechanism, or even human comprehension. But the leading astronomical facts produced by the changes in the relative position of the sun, the earth and the moon, and their causes, are made obvious to the eye, on any day in the year. The place of the earth among the signs of the zodiac as she moves in her orbit; the changes of the axis of the earth and of the poles in their relations to the plane of the ecliptic and of the direction of the sun's rays, north or south of the equator, before and after passing the equinoxes; the diurnal revolution of the earth and the divisions of time into day and night, constantly changing and differing in their proportionate periods in different regions; and the motions and relations of the moon, the earth, and the sun, producing eclipses;—these grand phenomena of the natural world are all made manifest by a simple mechanism. And by conforming in its construction to a true vertical ecliptic for the orbit of the earth, a clear comprehension of these sublime operations of nature, and their physical causes, is conveyed to the mind with at least approximate accuracy.

A is a base or stand supported by four set-screws, $a\ a\ a\ a$, by which it may be adjusted level on a table. Rising from the middle of the base A is a perpendicular pillar, B, on one side of which is fastened a circular metal plate or dial, C, the face of which is vertical, and exhibits the notations of time in months, or days, or any desired subdivisions, and also the signs of the zodiac and the division of the equinoxes and the solstices. A strong round rod or spindle, D, extends at right angles from the centre of the dial-plate C, and is firmly fixed to the pillar B. On the outer end of the spindle D is set a small circular plate or disk, E, on the outside of which is a flat, curved spring, F, operated by a nut or screw, $b$, placed on the end of the spindle. On the spindle D, near the middle, is a small fixed metal ball, G, fig. 2, to represent the sun, from which radiate, like the spokes of a wheel, in a plane parallel with the face of the dial-plate C, a number of pointed spikes, $c\ c$, representing the rays of the sun. A frame of two sides, H H, united at the top, is hung on the spindle D, on which it turns, revolving between the dial-plate C and the disk E, which is pressed against one of the sides, H, by the spring F. The frame H H revolves within a metal band, I, which represents the zodiacal belt, and is secured at the top and bottom by projecting arms, $d\ d'$, with set-screws, $e\ e'$, which work in slots, and allow of adjustment of the belt for illustrations, as required. Between the sides of the frame H H, and directly over the ball representing the sun, G, in a line with the radiating spikes $c\ c$, is suspended a larger metal globe, K, representing the earth, which is so suspended as to keep her axis always in the same angle of inclination to the plane of her orbit, and preserve "the obliquity of the ecliptic," while, at the same time, she makes her diurnal revolution; thus in moving around the sun changing the relative position of the two poles, and receiving the direct rays of the sun on one or the other side of the equator, according to her place among the constellations. The axis of the earth is a spindle, $f\ f$, the northern end of which turns upon a fixed centre or pivot on the inside of the frame H H, next to the dial-plate C, while the southern end of the axis turns in a revolving arm or vernier, $g$, which hangs on a pivot, $h$, in the middle of a small fixed dial-plate, L, with a set-screw, $z$, to fasten it to the dial, which is fixed upon the other side of the frame H H. The vernier $g$ has a pointer, $r$, and the dial-plate L may be used for notations of time and other phenomena. The globe K, thus suspended, will revolve on its axis by its own weight and exhibit the diurnal revolution, when the frame H H is moved around by a crank handle at $i$, while, by the same movement, the vernier $g$ continues in a vertical position; and its axis, $ff$, keeps its angle of inclination to the plane of its orbit, passing through all the phases and intermediate positions in the revolution around the sun, (now elevating the north and now the south pole,) explaining the changes of the seasons and the periods of day and night on all parts of the earth. A dial pointer, $k$, is fixed at the northern end of the earth's axis, which points to the months and days, marked on the large dial C, and when the globe K revolves around the ball G, the true relative position of the earth and the sun will be seen on any day in the year. In the summer solstice the spikes $c\ c$, representing the direct vertical rays of the sun, will point to the tropic of Cancer, and, in the winter solstice, to the tropic of Capricorn. At the vernal and autumnal equinoxes, they will point directly to the equator. On the globe K, lines are drawn to show the equator, and divide the zones; and all the countries and other principal geographical distinctions of the surface of the earth, common to terrestrial globes, may be represented for more perfect illustrations of the phenomena especially affecting them. A detached hemispherical night-cap, M, has been provided for illustrating the changes of day and night in different regions of the earth, according to her position with relation to the sun, and by adjusting it to the time of midwinter, as shown in the drawing, sheet No. 2, it will be seen that all that part of the surface of the globe K lying within the arctic circle will be enveloped in darkness, while that within the antarctic circle will be illuminated during the whole twenty-four hours, and for a period of months, until the poles change their position of inclination to the plane of the ecliptic, by the revolution of the earth, when the phenomena of light and darkness will be reversed within the arctic and antarctic zones, and all the changes of periodicity of day and night will be exhibited at the different seasons of the year in all other regions. The physical causes of all these changes and phenomena are thus made apparent to the eye; and by referring to the dial-plate C, or zodiacal belt I, the signs of the zodiac will show the place of the earth K among the constellations on every day in the year, as she moves in her orbit around the sun G. The cap M can be used at pleasure; it may be held in the hand or it may be fixed in position over the earth by a rod, $l$, passing through the top of the frame H H, with slots at the sides for the axis of the earth to move in, while it is kept in a level position by a spiral spring, $m$, around the rod $l$. A small metal globe, representing the moon, N, fig. 3, detached, with one-half its surface black, is connected to the earth, when required for illustration, by a curved wire rod, $n$, fastened to the axis with a set-screw, $o$, by which it moves around its primary, presenting always the same side to the earth, and exhibiting the causes of its changes and of eclipses by its position relatively to the sun and the earth, when properly placed and adjusted for illustration. The night-cap M and the moon N are to be made adjustable, and used together or independently, as may be desired. A crank, $p$, is provided to be connected and used as desired, to exhibit the diurnal motion of the earth on its own axis, for special illustrations.

Having fully described the theory, construction, and manner of using my invention, what I claim as new, and desire to secure by Letters Patent, is—

1. I claim the stand A and the pillar B, combined with the vertical dial-plate C; the horizontal spindle D, carrying the sun G; and the frame H H, carrying the earth K, revolving on its own axis, $ff$, in the suspended vernier $g$, and, while revolving vertically around the sun G, with the frame H H, keeping its true angle of inclination to the ecliptic throughout her orbit, arranged and operating substantially in the manner and for the purposes herein described and specified.

2. I claim the zodiacal belt I, in combination with the pillar B, the dial-plate C, the frame H H, the sun G, and the earth K, arranged and applied substantially as and for the purposes herein described.

3. I claim the adjustable moon N, in combination with the earth K, and its axis $ff$, arranged and applied substantially as and for the purposes herein set forth.

4. I claim the radiating points $c\ c$, representing the rays of the sun, in combination with the spindle D the sun G, and the earth K, arranged and applied substantially as and for the purposes herein described.

5. I claim the hemispherical night-cap M, in combination with the earth K, and its axis $ff$, and the sun G, arranged and applied substantially as and for the purposes herein described and represented.

ELEAZER ROOT.

Witnesses:
J. P. T. INGRAHAM,
E. M. McDONALD.